United States Patent [19]

Fivian

[11] 4,213,277
[45] Jul. 22, 1980

[54] METHOD FOR DRESSING A GRINDING WHEEL

[75] Inventor: Daniel A. Fivian, Horgen, Switzerland

[73] Assignee: Maag Gear-Wheel & Machine Company Limited, Zürich, Switzerland

[21] Appl. No.: 899,221

[22] Filed: Apr. 24, 1978

[30] Foreign Application Priority Data

May 5, 1977 [CH] Switzerland ..................... 5626/77

[51] Int. Cl.² .......................... B24B 1/00; B24B 53/00
[52] U.S. Cl. .................................. 51/325; 125/11 AS; 125/11 ST; 125/11 CW; 125/11 DF; 51/165.88; 51/165.82
[58] Field of Search ............... 51/165.87, 165.88, 325; 125/11 AS, 11 ST, 11 CW, 11 DF, 11 R

[56] References Cited

U.S. PATENT DOCUMENTS

| | | | |
|---|---|---|---|
| 2,634,556 | 4/1953 | Aeppli | 125/11 ST |
| 3,033,187 | 5/1962 | Wespi | 125/11 CW |
| 3,327,432 | 6/1967 | Lockwood | 125/11 R |
| 3,828,477 | 8/1974 | Sanford et al. | 51/165.87 |
| 3,840,792 | 10/1974 | Yokoe | 51/165.87 |

FOREIGN PATENT DOCUMENTS

| | | | |
|---|---|---|---|
| 2043878 | 3/1972 | Fed. Rep. of Germany | 51/165.87 |
| 2553510 | 5/1976 | Fed. Rep. of Germany | 125/11 CW |

*Primary Examiner*—Harold D. Whitehead
*Assistant Examiner*—K. Bradford Adolphson
*Attorney, Agent, or Firm*—Werner W. Kleeman

[57] ABSTRACT

A method of intermittently dressing the ring-shaped surface or active rim of an axially adjustable dished grinding wheel of a gear grinding machine and which active rim acts upon a workpiece. The position of the active rim is controlled and the grinding wheel adjusted such that the ring-shaped surface or active rim is retained at the same location independent of its wear. The active rim is dressed once within a predetermined dressing interval by means of a likewise axially advanced dressing tool. The dressing tool is then advanced if, within the dressing interval, the grinding disk adjustment or compensating feed has dropped below a predetermined total magnitude.

6 Claims, 2 Drawing Figures

METHOD FOR DRESSING A GRINDING WHEEL

BACKGROUND OF THE INVENTION

The present invention relates to a new and improved method of intermittently dressing an axially adjustable plate-shaped or dished grinding wheel of a gear grinding machine.

Generally speaking, the invention is concerned with a gear wheel-dressing method wherein the position of the ring-shaped portion or active rim of the grinding wheel is controlled and the grinding wheel is advanced or adjusted such that the active rim is retained at the same location independent of its wear. The active rim is dressed one respective time within a predetermined dressing interval by means of at least one likewise axially advancable dressing tool.

In order to obtain a high cutting efficiency of heavy-duty grinding wheels during grinding of gears, there prevails an important requirement as concerns dressing of the grinding wheel to prevent grinding wheel burn. Under the term "dressing" as used herein there is to be understood an operation by means of which there is reestablished at the grinding wheel its original contour and sharpness. Therefore, this operation also is referred to as resharpening of the grinding wheel. Diamonds are predominantly used as the dressing tools.

Now there are known to the art, for instance from German Patent Publication No. 25 53 510, equipment wherein a grinding wheel, for the dressing thereof, is brought from a work position into a dressing position and after the dressing operation is again returned back from the dressing position into a work position. This positional shifting of the grinding wheel is accomplished by means of a feed drive or gearing which compensates for the wear of the dressing tool during movement of the grinding wheel from the dressing position to the work position. Such type apparatuses are quite complicated in their construction and require an appreciable amount of time for the dressing of the grinding wheel.

Further, there are known to the art from the Publication "Taschenbuch der Maag-Zahnräder AG" (Maag Gear Book, Calculation and Manufacture of Gears and Gear Drives for Designers and Works Engineers, Zürich 1963 Edition, equipment resorting to manual axial adjustment or feed of the dressing tool in or towards the direction of the ring-shaped surface or active rim of the grinding wheel which is to be resharpened. Superfluous compensating advance or feed movements of the dressing tool can produce useless dressing losses of the grinding wheel and losses in accuracy during the grinding process, whereas required but unaccomplished compensating advance or feed movements can result in grinding wheel burn. The absolute dependency of the manual operation upon the experience and dexterity of the operator constitutes one of the basic drawbacks of this system.

SUMMARY OF THE INVENTION

Hence, with the foregoing in mind, it is a primary object of the present invention to provide a new and improved method for dressing grinding wheels in a manner not associated with the aforementioned drawbacks and limitations of the prior art proposals.

Another and more specific object of the present invention aims at a new and improved method of dressing grinding wheels, which enables such operation to be performed without requiring any special experience and dexterity on the part of the operator, wherein nonetheless the dressing operation is accomplished, on the one hand, in a manner avoiding over-dressing of the grinding wheels so as to save material and increase longevity thereof, and, on the other hand, still adequately dressing such grinding wheel in order that it remains sharp and to avoid grinding wheel burns.

Yet, a further significant object of the present invention aims at providing a new and improved method for dressing grinding wheels in an automatic, highly efficient and accurate manner, which method is extremely reliable in operation and not readily subject to malfunction or breakdown.

Now in order to implement these and still further objects of the invention, which will become more readily apparent as the description proceeds, the method aspects of the present development are manifested by the features that the dressing tool is always then advanced or fed if, within a dressing interval, the compensating advance or adjustment of the grinding wheel has fallen below a predetermined total magnitude or value.

The grinding wheel or disk may be advantageously fed by accomplishing a predetermined number of adjustment feeds thereof, such as in the order of about 1 to 10, preferably between 2 and 3 by way of example.

The method of the invention has the further advantage that there is prevented smoothing of the revolving grinding wheel by a dressing tool which only just bears thereat and slides over its active ring-shaped surface or rim and equally any bluntness or dullness of the dressing tool.

Not only is the invention concerned with the aforementioned method aspects, but also relates to apparatus for the performance thereof, which is generally manifested by the features that there is provided a control device or means having an input side which is connected with a control unit controlling the position of the grinding wheel, and the output side of which control device is connected with a feed or advance drive for the dressing tool. The control device embodies a counter, the counter state of which changes by one unit during each advance or adjustment feed of the grinding wheel. This control device additionally is provided with a comparator which, upon reaching a predetermined counter state, triggers an activation signal for the feed drive of the dressing tool.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
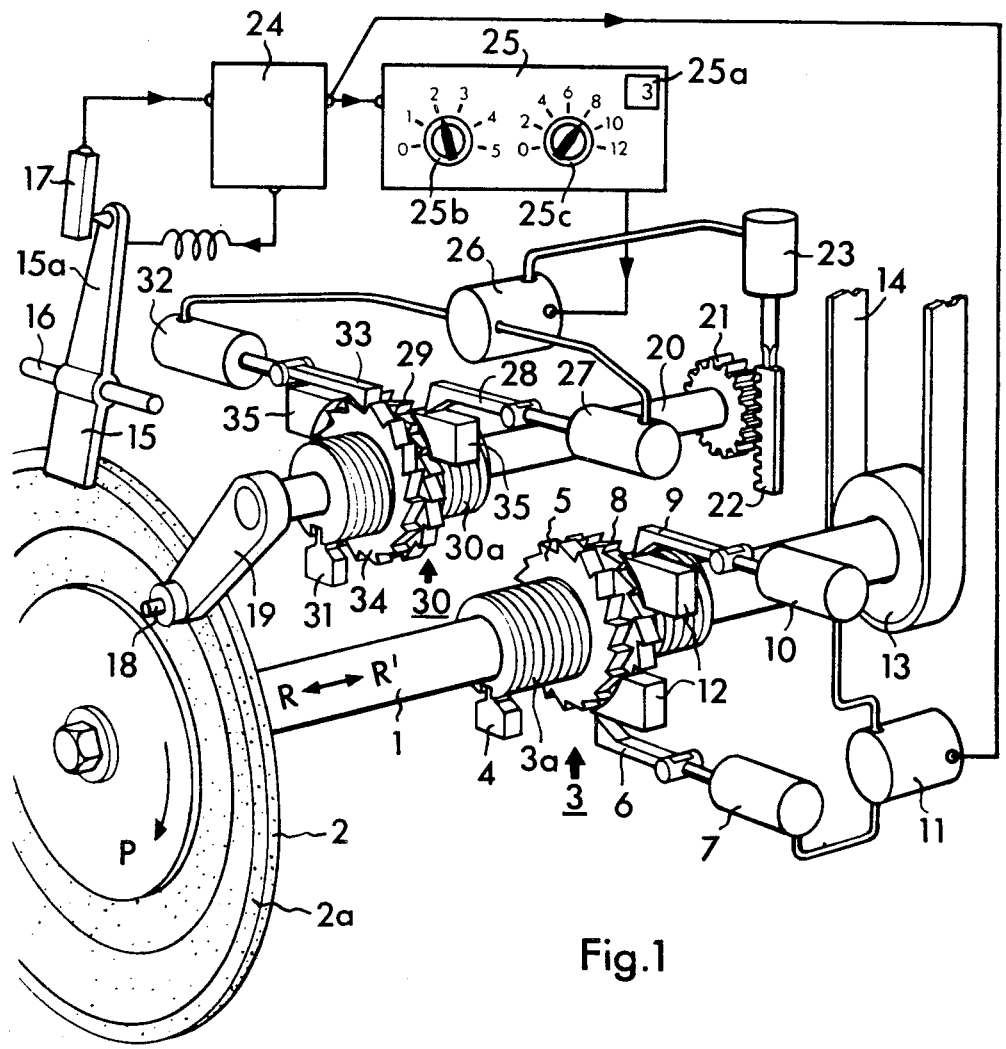
FIG. 1 is a perspective view of a dressing apparatus constructed according to the teachings of the present invention and useful for the practice of the method aspects.

Describing now the drawings, in the showing of FIG. 1 there is attached to a grinding spindle 1 of a gear grinding machine working according to the partial-rolling or partial-generating method a dished or plate-shaped grinding disk or wheel 2 which grinds, by means of a planar ring-shaped surface or active rim 2a, the tooth flanks of a not particularly illustrated gear defining a workpiece. The grinding spindle 1 is mounted in a spindle bearing or support arrangement 3 having external threads 3a, and further, is guided to be axially displaceable but secured against rotation in a guide means or guide 4 which has only been partially shown in FIG. 1 to simplify the illustration.

Threaded onto the external threads 3a is a first ratchet wheel 5 for the positional adjustment or compensating advance or feed of the spindle support arrangement 3 together with the grinding spindle 1 in the direction of the arrow R. This first ratchet wheel 5 is secured against axial displacement and can be rotated by an adjustment or feed drive 7 by means of a first pawl 6. Fixedly connected with the first ratchet wheel 5 is a second ratchet wheel 8 serving for the return movement of the spindle support arrangement 3 together with the grinding spindle 1 in the direction of the arrow R', and for this purpose the second ratchet wheel 8 has teeth oppositely directed from those of the first ratchet wheel 5. The second ratchet wheel 8 cooperates with a second pawl 9 and associated return movement drive or drive means 10. The compensating advance or feed drive 7 and the return movement or return drive 10 are connected with a control element 11. The pawls 6 and 9 each have associated therewith a respective deflector or diverter 12 which maintains the related pawl, in its retracted position, lifted-off from the associated ratchet wheel 5 and 8 respectively, so that each of the pawls 6 and 9, independent of the other, is capable of initiating a conjoint rotation of the ratchet wheels 5 and 8 in the one or other rotational sense, and thus, bringing about an axial compensating advance feed or return movement of the spindle support or mounting arrangement 3 together with the grinding spindle 1 and the grinding wheel 2 in the direction of the arrows R and R', respectively, as desired.

The grinding spindle 1 is rotatably drivable in the direction of the arrow P by means of a belt pulley 13 or equivalent structure which is secured thereat and a drive belt 14.

Now for the purpose of scanning the active rim or ring-shaped surface 2a of the grinding wheel 2 there is provided a feeler 15, here shown in the form of a double-arm lever 15a which is pivotably mounted upon a stationary axle or shaft 16 and coacts with a contact 17.

In order to dress the grinding wheel 2 there is used a suitable dressing tool 18 which is mounted at the end of a lever 19 which, in turn, is secured to a shaft 20. Attached to the shaft 20 is a pinion 21. Meshing with the pinion 21 is a gear rack 22 operatively connected with a dressing drive 23.

Contact 17 is connected with a control unit 24 which, in turn, is operatively connected with the control element 11 and also with a control device 25. The control device 25 contains a display device 25a for the digital display of the number of compensating advance or feed movements of the grinding wheel 2 within a dressing interval. Control device 25 also embodies a switch 25b for the pre-selection of the number of such advance or feed movements per dressing interval and a switch 25c for the pre-selection of a magnitude through which the grinding wheel 2 should be fed back at the start of each working operation.

The control device 25 is connected with a control element 26 which, in turn, is connected with a feed or advance drive 27 for the dressing tool 18. The feed drive 27 coacts by means of a pawl 28 with a ratchet wheel 29. This ratchet wheel 29 is threaded onto the external threads 30a of a shaft support or bearing arrangement 30 for the shaft 20 and is secured against axial displacement. The shaft support arrangement 30 is axially displaceably guided and secured against rotation in the guide means 31 which has only been partially illustrated in FIG. 1 to simplify the showing. The control element 26 is furthermore connected with a return drive 32 for the dressing tool 18. This return drive or return feed drive 32 coacts by means of a pawl 33 with a ratchet wheel 34 which is fixedly connected with the ratchet wheel 29. The pawls 28 and 33 have each operatively associated therewith a deflector or diverter 35 which maintains in a lifted position and related pawl in its retracted state from the associated ratchet wheel 29 and 34 respectively.

Having now had the benefit of the dressing apparatus as illustrated in FIG. 1, there will be now considered its mode of operation which is as follows:

The position of the active rim or ring-shaped surface 2a of the wheel 2 is cyclically controlled, i.e., the feeler 15 is intermittently applied at the ring-shaped surface or active rim 2a. Now as soon as owing to a certain amount of wear of the active rim 2a the contact 17 is closed, then the control unit 24 delivers a command for the positional adjustment or feed to the control element 11. Such command turns-on the adjustment drive 7 which operates the first pawl 6. The thus initiated positional adjustment or feed of the grinding wheel 2 is monitored by the control device 25, the display device 25a of which visually displays the number of adjustment feeds or compensating advances. Now if within a certain dressing interval—the duration of which can be selected, on the one hand in accordance with the properties of the grinding wheel, and, on the other hand, in accordance with the amount of material which is to be removed from the workpiece—there is not attained the number of compensating advance or feed movements which have been pre-selected at the switch 25b, then a pulse is delivered to the feed drive 27 for the feed or advance of the dressing tool 18. Thereafter, the dressing drive 23 receives a pulse from the control element 26, so that the lever 19 together with the dressing tool 18 is rocked past the active rim or ring-shaped surface 2a of the grinding wheel 2. At the same time with each pulse there is extinguished at the display device 25a the summed up number of compensating advance or feed movements of the grinding wheel 2.

In order to maintain as high as possible the number of grinding grains of the grinding wheel 2 which are effective during the first rough-machining revolutions of the grinding wheel, for instance owing to change in the attack angle of the grinding wheel during the grinding process, it is possible at the start of the work at a new workpiece to return the dressing tool 18 by an amount which can be pre-selected at the switch 25c. The return feed is brought about by the control element 26 which activates the drive 32, so that the latter, in turn, activates by means of the pawl 33 and the ratchet wheel 34. This return motion of the dressing tool 18 can occur either automatically as part of the course of the work cycle, or can be initiated at the control device 25 by a special triggering action.

Figure 2:
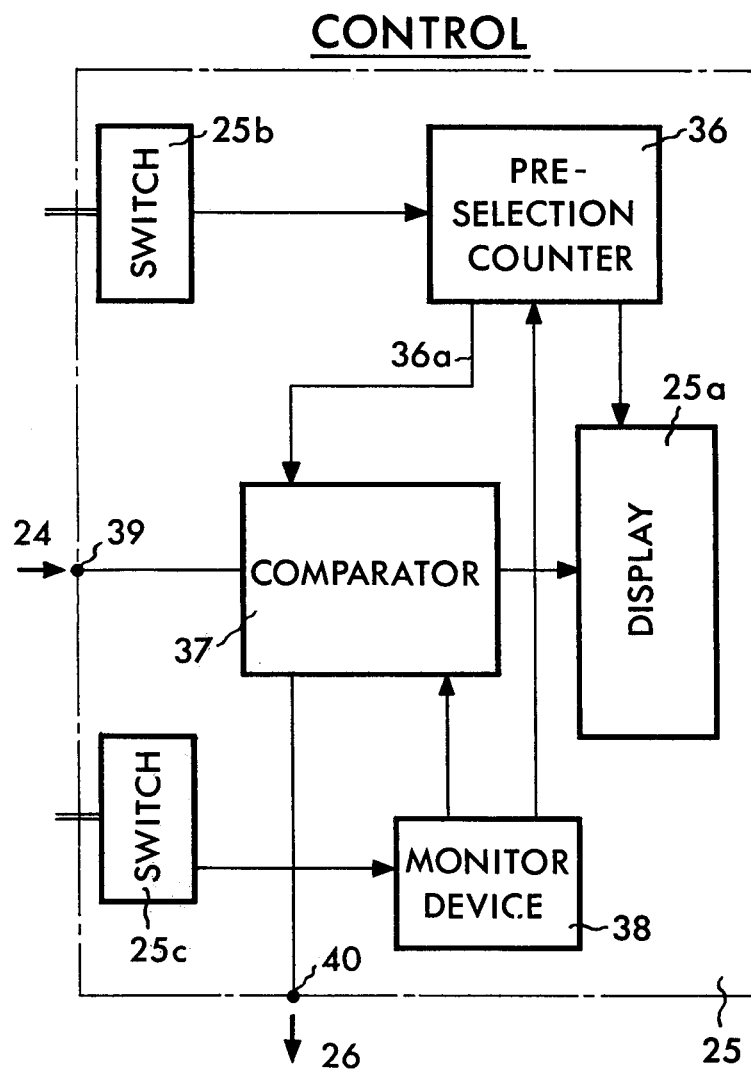
FIG. 2 is a block circuit diagram of the control device illustrated in FIG. 1.

Now, according to the block circuit diagram of FIG. 2, relating to the control device 25, it will be seen that apart from the previously considered display device 25a and the switches 25b and 25c, it contains a pre-selection counter 36 and a comparator 37. The comparator 37 is connected by means of a first connection point or terminal 39 with the control unit 24 and by means of a second connection point or terminal 40 with the control element 26, and furthermore, is connected with the display device 25a, a monitoring device or unit 38 and one output 36a of the pre-selection counter 36. The pre-selection counter 36 is adjustable by means of the switch 25b and can transfer its contents to the display device 25a. The monitoring device 38 controls the functional course of the comparator 37, the pre-selection counter 36 as well as the display device 25a. Integrated in the monitor or monitoring device 38 is a clock generator which determines the duration of a dressing interval.

The comparator 37 sums the input signals received by means of the first connection point or terminal 39 and compares the result of this summation operation in each case with the value or magnitude which has been set at the preselection counter 36. Upon exceeding the set value the comparator 37 delivers a pulse train or pulse-like signal which appears at the second connection point or terminal 40 whenever there has been completed a dressing interval. Now, if within a dressing interval the grinding wheel-adjustments or feeds are such that they fall considerably below such set value of magnitude, then at the end of the dressing interval there is available a multiple of the signal, corresponding to the amount that the grinding wheel-adjustments or feeds have fallen below the set value, and thus, there is triggered a greater positional adjustment of the dressing tool 18. If, on the other hand, during a dressing interval the set value is appreciably exceeded, then at the end of the dressing interval there is only made available part of the signal, and thus, there is triggered a corresponding return positioning or movement of the dressing tool 18.

The display device 25a is controllable by means of the monitoring device or unit 38 in such a manner that it is selectively visually displays the number of accomplished positional adjustments or feeds of the grinding wheel 2, i.e., the input signals which have been added in the comparator 37, or the number of feed units of the dressing tool 18.

While there are shown and described present preferred embodiments of the invention, it is to be distinctly understood that the invention is not limited thereto, but may be otherwise variously embodied and practiced within the scope of the following claims.

Accordingly, what I claim is:

1. A method for the intermittent dressing of an active rim of an axially displaceable dished grinding wheel of a gear grinding machine and which active rim machines a workpiece, comprising the steps of:
   controlling the position of the active rim of the grinding wheel;
   adjusting the position of the grinding wheel by a number of compensating advances such that the active rim is retained essentially at the same location independent of its wear;
   employing at least one axially movable dressing tool for dressing the active rim of the grinding wheel once within a predetermined dressing interval; and
   feeding said dressing tool towards said grinding wheel when, within said dressing interval, the number of compensating advances of the grinding wheel falls below a predetermined total number of compensating advances, said dressing tool being fed towards said grinding wheel an amount corresponding to the amount by which the number of compensating advances of the grinding wheel falls below said predetermined total number of compensating advances.

2. The method as defined in claim 1, including the step of:
   feeding the dressing tool to a greater extent towards the grinding wheel the smaller the total number of compensating advances of the grinding wheel is in relation to said predetermined total number of advances within the dressing interval.

3. The method as defined in claim 1, including the steps of:
   cyclically controlling said position of the active rim of the grinding wheel; and
   said adjusting of said position of the grinding wheel includes stepwise feeding said grinding wheel.

4. The method as defined in claim 3, wherein:
   said predetermined number of compensating advances of the grinding wheel is on the order of about 1 to 10.

5. The method as defined in claim 4, wherein:
   said predetermined number of compensating advances amounts to between 2 and 3.

6. A method for dressing at given intervals an active rim of an axially displaceable dished grinding wheel of a gear grinding machine, comprising the steps of:
   controlling the position of the active rim of the grinding wheel;
   adjusting the position of the grinding wheel by a number of compensating advances such that the active rim is retained at a predetermined location;
   employing at least one axially movable dressing tool for dressing the active rim of the grinding wheel within a predetermined dressing interval; and
   feeding said dressing tool towards said grinding wheel when, within said dressing interval, the number of compensating advances of the grinding wheel falls below a predetermined number of such advances, said dressing tool being fed towards said grinding wheel an amount corresponding to the amount by which the number of compensating advances of the grinding wheel falls below said predetermined total number of compensating advances.

* * * * *